United States Patent
Li et al.

(10) Patent No.: US 12,555,575 B2
(45) Date of Patent: Feb. 17, 2026

(54) WAKEUP INDICATOR MONITORING METHOD, APPARATUS AND ELECTRONIC DEVICE

(71) Applicant: Beijing Baidu Netcom Science Technology Co., Ltd., Beijing (CN)

(72) Inventors: Xu Li, Beijing (CN); Zeming Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 309 days.

(21) Appl. No.: 17/915,465

(22) PCT Filed: May 7, 2021

(86) PCT No.: PCT/CN2021/092100
§ 371 (c)(1),
(2) Date: Sep. 28, 2022

(87) PCT Pub. No.: WO2022/142048
PCT Pub. Date: Jul. 7, 2022

(65) Prior Publication Data
US 2023/0130399 A1 Apr. 27, 2023

(30) Foreign Application Priority Data
Dec. 28, 2020 (CN) .................. 202011577341.7

(51) Int. Cl.
*G10L 15/22* (2006.01)
*G10L 15/02* (2006.01)
*G10L 15/08* (2006.01)

(52) U.S. Cl.
CPC .............. *G10L 15/22* (2013.01); *G10L 15/02* (2013.01); *G10L 15/08* (2013.01); *G10L 2015/088* (2013.01)

(58) Field of Classification Search
CPC ......... G10L 15/22; G10L 15/02; G10L 15/08; G10L 2015/088; G10L 15/01; G10L 25/51; G10L 17/24; G06F 1/3206
See application file for complete search history.

(56) References Cited

U.S. PATENT DOCUMENTS

| 9,275,637 B1 * | 3/2016 | Salvador ................. G10L 15/06 |
| 11,295,741 B2 * | 4/2022 | Mont-Reynaud ....... G06F 3/167 |

(Continued)

FOREIGN PATENT DOCUMENTS

| CN | 106782536 A | 5/2017 |
| CN | 107767861 A | 3/2018 |

(Continued)

OTHER PUBLICATIONS

Ma, L., Zhang, H., Zhao, P., & Su, T. (2020). Competitive Wakeup Scheme for Distributed Devices. arXiv preprint arXiv:2005.09242. (Year: 2020).*

(Continued)

*Primary Examiner* — Richemond Dorvil
*Assistant Examiner* — Zeeshan Mahmood Shaikh
(74) *Attorney, Agent, or Firm* — Maginot, Moore & Beck LLP

(57) ABSTRACT

The present wakeup indicator monitoring method, apparatus and electronic device includes: acquiring M pieces of audio data of a device to be monitored; determining a first wakeup confidence of each piece of M pieces of audio data, wherein the first wakeup confidence indicates a probability that the audio data contains a first wakeup word for waking up the device to be monitored; acquiring a first audio data with a first wakeup confidence in a target zone in M pieces of audio data, wherein the wakeup confidence in the target zone indicates that the audio data contains a wakeup word for waking up an audio device; and determining the ratio of the (Continued)

first audio data to M pieces of audio data as a wakeup rate of a device to be monitored, where the wakeup indicator of the device to be monitored includes the wakeup rate.

10 Claims, 3 Drawing Sheets

(56) References Cited

U.S. PATENT DOCUMENTS

| | | | | |
|---|---|---|---|---|
| 11,521,599 | B1* | 12/2022 | Jose | G06F 17/15 |
| 2015/0154953 | A1* | 6/2015 | Bapat | G10L 15/06 |
| | | | | 704/251 |
| 2016/0077792 | A1* | 3/2016 | Bansal | G06F 3/167 |
| | | | | 704/275 |
| 2020/0105256 | A1* | 4/2020 | Fainberg | G10L 15/30 |
| 2020/0160858 | A1* | 5/2020 | Gomes | G06F 3/167 |
| 2020/0193971 | A1 | 6/2020 | Feinauer et al. | |
| 2020/0365152 | A1* | 11/2020 | Han | G10L 15/22 |
| 2021/0183370 | A1* | 6/2021 | Saadoun | G10L 25/51 |
| 2022/0013111 | A1 | 1/2022 | Chen et al. | |
| 2022/0223150 | A1* | 7/2022 | Li | G10L 15/08 |

FOREIGN PATENT DOCUMENTS

| | | | | |
|---|---|---|---|---|
| CN | 107871506 | A | | 4/2018 |
| CN | 107990908 | A | | 5/2018 |
| CN | 108536668 | A | * 9/2018 | ............ G10L 15/02 |
| CN | 108694940 | A | | 10/2018 |
| CN | 108735203 | A | | 11/2018 |
| CN | 108847219 | A | | 11/2018 |
| CN | 109817219 | A | | 5/2019 |
| CN | 110164474 | A | | 8/2019 |
| CN | 110428810 | A | | 11/2019 |
| CN | 110473539 | A | | 11/2019 |
| CN | 110570840 | A | | 12/2019 |
| CN | 110838289 | A | * 2/2020 | ............ G10L 15/16 |
| CN | 111081241 | A | * 4/2020 | ....... H04M 1/72403 |
| CN | 111739512 | A | | 10/2020 |
| CN | 111767083 | A | | 10/2020 |
| CN | 111880856 | A | | 11/2020 |
| KR | 20190034964 | A | | 4/2019 |

OTHER PUBLICATIONS

Extended European Search Report corresponding to European Patent Application No. 21912809.7, dated Oct. 12, 2023. (10 Pages).
English Translation of CN107767861A. (23 Pages).
Japanese Office Action corresponding to Japanese Patent Application No. 2022-514849, dated Apr. 18, 2023. (4 Pages).
Machine English Translation Japanese Office Action corresponding to Japanese Patent Application No. 2022-514849, dated Apr. 18, 2023. (4 Pages).
Machine English Translation of CN111767083A. (25 Pages).
English Translation of International Search Report corresponding to International Patent Application No. PCT/CN2021/092100, dated Sep. 28, 2021. (6 pages).
International Search Report corresponding to International Patent Application No. PCT/CN2021/092100, dated Sep. 28, 2021. (9 pages).
Chinese Office Action corresponding to Chinese Patent Application 202011577341.7, dated Jan. 6, 2022. (9 Pages).
Machine English Translation Chinese Office Action corresponding to Chinese Patent Application 202011577341.7, dated Jan. 6, 2022. (5 Pages).
Machine English Translation of CN110473539A. (22 Pages).
Machine English Translation of CN109817219A. (15 Pages).
Machine English Translation of CN108847219A. (18 Pages).
Machine English Translation of CN108735203A. (17 Pages).
Machine English Translation of CN108694940A. (32 Pages).
Machine English Translation of CN107990908A. (22 Pages).
Machine English Translation of CN107871506A. (22 Pages).
Machine English Translation of KR20190034964A. (23 Pages).
Machine English Translation of CN111880856A. (34 Pages).
Machine English Translation of CN111081241A. (20 Pages).
Machine English Translation of CN110570840A. (32 Pages).
Machine English Translation of CN110428810A. (35 Pages).
Machine English Translation of CN111739512A. (25 Pages).
Machine English Translation of CN110164474A. (21 Pages).
Machine English Translation of CN106782536A. (21 Pages).

* cited by examiner

WAKEUP INDICATOR MONITORING METHOD, APPARATUS AND ELECTRONIC DEVICE

CROSS REFERENCE TO RELATED APPLICATIONS

This application is the U.S. national phase of PCT Application No. PCT/CN2021/092100 filed on May 7, 2021, which claims priority to Chinese Patent Application No. 202011577341.7 filed on Dec. 28, 2020, the entire contents of which are hereby incorporated by reference.

TECHNICAL FIELD

The present application relates to the technical field of artificial intelligence, in particular to the technical field of audio testing, and particularly to a wakeup indicator monitoring method, apparatus and electronic device.

BACKGROUND

Wakeup indicator in intelligent voice interaction device is always an important measure of user experience, which directly affects the user interaction rate and retention rate of intelligent voice interaction device. Therefore, as an important indicator of user experience, it is necessary to know the change of the wakeup indicator of the online intelligent voice interaction device.

The change of the wakeup indicator of the intelligent voice interaction device can be monitored by manually marking the wakeup indicator of the intelligent voice interaction device.

SUMMARY

The present disclosure provides a wakeup indicator monitoring method, apparatus and electronic device.

According to a first aspect of the present disclosure, there is provided a wakeup indicator monitoring method comprising:

acquiring M pieces of audio data of a device to be monitored, wherein M is a positive integer greater than 1;

determining a first wakeup confidence for each piece of the M pieces of audio data, the first wakeup confidence indicating a probability that audio data contains a first wakeup word for waking up the device to be monitored;

acquiring a first audio data with a first wakeup confidence in a target zone among the M pieces of audio data, wherein the wakeup confidence indicates that the audio data in the target zone comprises a wakeup word for waking up an audio device; and determining the ratio of the first audio data to the M pieces of audio data as a wakeup rate of the device to be monitored, where a wakeup indicator of the device to be monitored comprises the wakeup rate.

According to a second aspect of the present disclosure, there is provided a wakeup indicator monitoring method comprising:

acquiring M pieces of audio data of a device to be monitored, wherein M is a positive integer greater than 1;

determining a first wakeup confidence for each piece of the M pieces of audio data, the first wakeup confidence indicating a probability that audio data contains a first wakeup word for waking up the device to be monitored;

acquiring first audio data with a first wakeup confidence in a target zone in the M pieces of audio data, wherein the wakeup confidence in the target zone characterizes that the audio data does not contain a wakeup word for waking up an audio device; and determining the ratio of the first audio data to the M pieces of audio data as a false wakeup rate of the device to be monitored, where a wakeup indicator of the device to be monitored comprises the false wakeup rate.

According to a third aspect of the present disclosure, there is provided a wakeup indicator monitoring device comprising:

a first acquisition module for acquiring M pieces of audio data of a device to be monitored, wherein M is a positive integer greater than 1;

a first determination module for determining a first wakeup confidence of each piece of the M pieces of audio data, wherein the first wakeup confidence indicates a probability that audio data contains a first wakeup word for waking up the device to be monitored;

a second acquisition module for acquiring a first audio data of which the first wakeup confidence is in a target zone in the M pieces of audio data, wherein the wakeup confidence in the target zone characterizes that the audio data contains a wakeup word for waking up an audio device; and a second determination module for determining the ratio of the first audio data to the M pieces of audio data as a wakeup rate of the device to be monitored, wherein a wakeup indicator of the device to be monitored comprises the wakeup rate.

According to a fourth aspect of the present disclosure, there is provided a wakeup indicator monitoring device comprising:

a fourth acquisition module for acquiring M pieces of audio data of a device to be monitored, wherein M is a positive integer greater than 1;

a fourth determination module for determining a first wakeup confidence of each piece of the M pieces of audio data, wherein the first wakeup confidence indicates a probability that the audio data contains a first wakeup word for waking up the device to be monitored;

a fifth acquisition module for acquiring the first audio data of which the first wakeup confidence is in the target zone in the M pieces of audio data, wherein the wakeup confidence in the target zone characterizes that the audio data does not contain a wakeup word for waking up an audio device; and a fifth determination module for determining the ratio of the first audio data to the M pieces of audio data as a false wakeup rate of the device to be monitored, wherein a wakeup indicator of the device to be monitored comprises the false wakeup rate.

According to a fifth aspect of the present disclosure, there is provided an electronic device comprising:

at least one processor; and a memory communicatively coupled to the at least one processor; wherein, the memory stores instructions executable by the at least one processor to enable the at least one processor to perform any one of the methods of the first aspect or to perform any one of the methods of the second aspect.

According to a sixth aspect of the present disclosure there is provided a non-transitory computer readable storage medium storing computer instructions for causing a computer to perform any one of the methods of the first aspect or to perform any one of the methods of the second aspect.

According to a seventh aspect of the present disclosure, there is provided a computer program product enabling an electronic device to perform any one of the methods of the first aspect or to perform any one of the methods of the second aspect when the computer program product is running on the electronic device.

It should be understood that the description herein is not intended to identify key or critical features of the embodiments of the disclosure or to limit the scope of the disclosure. Other features of the present disclosure will become readily apparent from the following description.

BRIEF DESCRIPTION OF THE DRAWINGS

The drawings are included to provide a better understanding of the invention and are not to be construed as limiting the invention. Wherein.

DETAILED DESCRIPTION

The following description of the exemplary embodiments of the present application, taken in conjunction with the accompanying drawings, includes various details of the embodiments of the application to facilitate understanding and are to be construed as exemplary only. Accordingly, those of ordinary skill in the art will recognize that various changes and modifications may be made to the embodiments described herein without departing from the scope and spirit of the present application. Also, descriptions of well-known functions and constructions are omitted from the following description for clarity and conciseness.

First Embodiment

Figure 1:
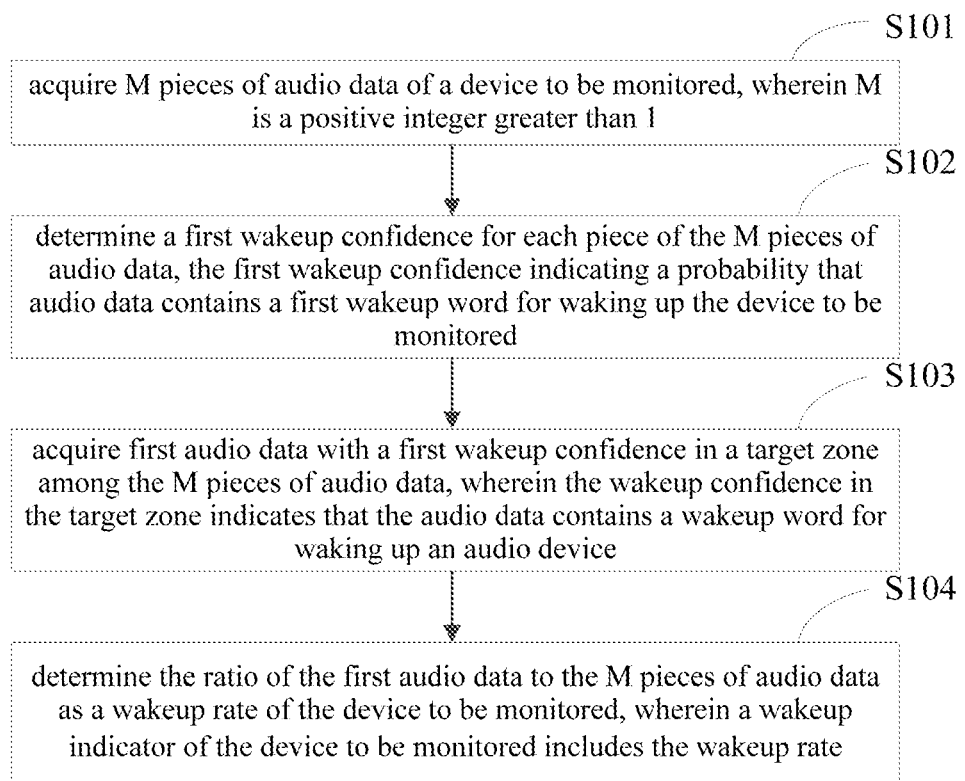
FIG. 1 is a schematic flow diagram of a wakeup indicator monitoring method according to a first embodiment of the present application.

As shown in FIG. 1, the present application provides a wakeup indicator monitoring method, comprising the following steps:

Step S101: acquiring M pieces of audio data of a device to be monitored, wherein M is a positive integer greater than 1.

In the present embodiment, the wakeup indicator monitoring method relates to the technical field of artificial intelligence, and particularly relates to the technical field of audio testing, which can be widely used in many scenarios, such as end-to-end acceptance of various new types of intelligent voice interaction devices and online monitoring for wakeup functions.

In actual use, the wakeup indicator monitoring method according to the embodiment of the present application can be executed by the wakeup indicator monitoring device according to the embodiment of the present application. The wakeup indicator monitoring apparatus of an embodiment of the present application can be configured in any electronic device to execute the wakeup indicator monitoring method of an embodiment of the present application. The electronic device may be a server or a terminal, and is not particularly limited herein.

The device to be monitored may be an intelligent audio device, which may also be referred to as an intelligent voice interaction device, for example, the device to be monitored may be an intelligent speaker device or an intelligent recording device, etc.

The intelligent voice interaction device refers to a device which can wakeup by voice, for example, a user speaks a "beep" to the intelligent voice interaction device, and the intelligent voice interaction device can enter an operation mode in response to the voice. At this time, the intelligent voice interaction device is awakened, and accordingly, "a small beep" can be referred to as a wakeup word of the intelligent voice interaction device.

The M pieces of audio data of the device to be monitored refer to audio data of the device to be monitored after starting, and the audio data may comprise data of a first wakeup word received by a user for waking up the device to be monitored, and/or data generated after the device to be monitored wakes up.

In a general case, a device to be monitored can comprise a plurality of modes, for example, a sleep mode and an operation mode, etc.; when the device to be monitored is in the sleep mode, a user can wakeup the device to be monitored via voice data comprising a first wakeup word; accordingly, the device to be monitored is woken up, and can be switched from the sleep mode to the operation mode, and at this time, it can be referred to as one wakeup of the device to be monitored.

However, due to various factors, the device to be monitored may be awakened by mistake in the sleep mode, for example, the device to be monitored wakes up in response to other voice data of the user which does not contain the first wakeup word of the user waking up the device to be monitored, and for example, the device to be monitored wakes up without any symptoms, i. E. Without receiving any voice data, which may be referred to as a false wakeup of the device to be monitored. The purpose of the embodiments of the present application is to monitor a wakeup indicator of a device to be monitored, wherein the wakeup indicator can be a wakeup rate, so as to monitor the wakeup performance of the device to be monitored, and perform device acceptance or product development.

Each time the device to be monitored wakes up, audio data received and generated during the switching of the device to be monitored from the sleep mode to the operational mode may be stored, generating audio log data. Accordingly, M pieces of audio data of the device to be monitored can be obtained from the audio log data. Wherein each piece of audio data of the device to be monitored can be data received and generated during one wakeup process of the device to be monitored.

It should be noted that M is a positive integer greater than 1; however, in order to generally improve the monitoring accuracy of the wakeup indicator of the device to be monitored and prevent the fluctuation of the wakeup indicator of the device to be monitored due to the small number of monitoring, generally, the number of M is relatively large, which may be in the order of thousands or tens of thousands, for example, M is 5 thousands or 10 thousands.

Step S102: determining a first wakeup confidence for each piece of the M pieces of audio data, the first wakeup confidence indicating a probability that audio data contains a first wakeup word for waking up the device to be monitored.

In the embodiment of the present application, in a normal wakeup condition, the audio data of the device to be monitored contains a first wakeup word for waking up the device to be monitored, while in a false wakeup condition, the audio data of the device to be monitored generally does not contain a first wakeup word for waking up the device to be monitored.

Whether each audio data of the device to be monitored contains the first wakeup word may be determined by determining a first wakeup confidence for each of the M pieces of audio data. Wherein the first wakeup confidence measure characterizes the probability that the first wakeup word is contained in the audio data of the device to be monitored.

The value of the first wakeup confidence can usually be 0 to 1; in the case where the first wakeup confidence is 1, the audio data characterizing the device to be monitored comprises the first wakeup word; in the case where the first wakeup confidence is 0, the audio data characterizing the device to be monitored does not comprise the first wakeup word; the higher the first wakeup confidence, the higher the probability that the audio data characterizing the device to be monitored comprises the first wakeup word; otherwise, the lower.

A first wakeup confidence of each piece of the M pieces of audio data can be determined via a target model, and the target model can be called a wakeup confidence model, which can be a deep learning model; the M pieces of audio data can be poured into a wakeup confidence model via a program; and the wakeup confidence model can score each piece of audio data for each piece of audio data to obtain the first wakeup confidence of each piece of the M pieces of audio data.

It should be noted that the wakeup confidence model needs to be pre-trained before scoring, and multiple pieces of audio data of multiple intelligent audio devices can be acquired, and a tag of each piece of audio data serves as training sample data of the wakeup confidence model to train the wakeup confidence model. The tag of the audio data comprises a positive tag and a negative tag, wherein the positive tag can be identified by a numerical value of 0, indicating that the audio data does not contain a wakeup word, and the negative tag is identified by a numerical value of 1, indicating that the audio data contains a wakeup word. The wakeup confidence model obtained by the final training can score the wakeup confidence of the audio data of the intelligent audio device to obtain a wakeup confidence score of 0 to 1, and characterize the probability of containing a wakeup word in the audio data.

Step S103: acquiring first audio data with a first wakeup confidence in a target zone in the M pieces of audio data, wherein the wakeup confidence in the target zone characterizes that the audio data contains a wakeup word for waking up an audio device.

The target zone may be predetermined, which may be a wakeup threshold range, in which application scenario the target zone characterizes that the audio data contains a wakeup word for waking up the audio device. The audio device may be an intelligent audio device. That is, if the wakeup confidence of the audio data is within the target zone, the audio data typically contains a wakeup word for the audio device.

In an application scenario where the target zone is a wakeup threshold range, matching a first wakeup confidence of each piece of audio data in the M pieces of audio data with the target zone, and if the first wakeup confidence of the audio data in the M pieces of audio data is in the target zone, then the audio data is first audio data, and a first wakeup word is contained therein, namely, the piece of audio data is audio data under the normal wakeup of a device to be monitored. And if the first wakeup confidence of the audio data in the M pieces of audio data is not in the target zone, the audio data is not first audio data, and a first wakeup word is not contained therein, that is to say, the piece of audio data is audio data which is awakened by a device to be monitored by mistake.

Step S104: determining the ratio of the first audio data to the M pieces of audio data as a wakeup rate of the device to be monitored, where a wakeup indicator of the device to be monitored comprises the wakeup rate.

In this step, in the case where the target zone is a wakeup threshold range, a wakeup rate of the device to be monitored may be determined based on the acquired first audio data, and the wakeup indicator may be a wakeup rate.

Specifically, a ratio of the first audio data to the M pieces of audio data can be determined, and the ratio can be obtained by dividing M based on the number of the first audio data.

In an application scenario where the target zone is a wakeup threshold range, since the first audio data is audio data corresponding to a device to be monitored actually waking up, the ratio can be determined as a wakeup rate of the device to be monitored.

In practical applications, the wakeup rate can be used as the evaluation criteria for product verification, for example, the higher the wakeup rate of the device to be monitored, the better the wakeup performance of the product is, while the lower the wakeup rate of the device to be monitored, the improvement in the wakeup performance of the product is required.

In practical applications, the wakeup rate can also verify the wakeup function of the product version, for example, when the product is developed, the device to be monitored embeds a new software version; in order to verify whether the software version has improved the wakeup performance, the wakeup rate of the device to be monitored embedded with the new software version and the wakeup rate of the device to be monitored embedded with the old software version can be compared; if the wakeup rate has improved, it means that the new software version has improved the wakeup performance; otherwise, it needs to be improved.

In the present embodiment, determining a first wakeup confidence of each piece of audio data in M pieces of audio devices of a device to be monitored; acquiring first audio data with a first wakeup confidence in a target zone in the M pieces of audio data, wherein the wakeup confidence characterizes audio data in the target zone comprises a wakeup word for waking up an audio device; determining the ratio of the first audio data to the M pieces of audio data as a wakeup rate of the device to be monitored. In this way, the on-line audio data of the device to be monitored can be automatically and timely monitored with a high wakeup rate, thereby improving the accuracy of the wakeup rate monitoring. Also, changes in the wakeup rate of each audio device on-line can be monitored in large quantities and quickly.

Moreover, without considering the uncertain factors such as manual annotation, the wakeup rate monitoring has strong operability and saves human resources, and can support the wakeup rate monitoring of different devices, with good reusability and scalability. In addition, unsupervised monitoring can be achieved, and an alarm threshold can be defined to achieve an on-line monitoring alarm.

Optionally, prior to step S101, the method further comprises:

acquiring P pieces of audio data of N audio devices and an annotation result of the P pieces of audio data, wherein the annotation result indicates whether the audio data contains a second wakeup word for waking up the audio devices, N is a positive integer, and P is a positive integer greater than 1;

determining a second wakeup confidence of each piece of the P pieces of audio data; and counting an zone where a second wakeup confidence of second audio data of which the ratio is greater than a pre-set threshold value in the P pieces of audio data is located, and obtaining the target zone, wherein the second audio data is the audio data with an annotation result that characterizes it contains the audio data of the second wakeup word.

This embodiment describes the process of the wakeup rate monitoring means determining the target zone before monitoring the wakeup rate of the device to be monitored. Wherein, the target zone, after being determined, can generally be used multiple times later.

The target zone, which may be a wakeup threshold range, may be determined by evaluating an zone of wakeup confidence that the audio data of each audio device on the line is actually awake. That is, if most of the audio data of a plurality of audio devices contain a wakeup word for waking up the audio device within a certain zone of the wakeup confidence, it means that the audio data corresponding to the wakeup confidence within the zone is the data generated when the audio device actually wakes up.

Specifically, P pieces of audio data of N audio devices on a line can be pulled, wherein N is a positive integer, and generally the value of N is greater than 1. That is, a plurality of pieces of audio data of a plurality of audio devices on a line can be pulled, such as 50,000 pieces of audio data of a plurality of audio devices on a line.

At the same time, a labeling result of the P pieces of audio data can be obtained, and the labeling result can be obtained by manually labeling the P pieces of audio data or using a speech recognition technique. Wherein the annotation result can comprise two types, the first type can be that the audio data contains a wakeup word, and the second type can be that the audio data does not contain a wakeup word.

A wakeup confidence score can be performed on each piece of the P pieces of audio data by using a wakeup confidence model to obtain a second wakeup confidence of each piece of the P pieces of audio data, and the second wakeup confidence can be used for characterizing a probability that audio data contains a second wakeup word for waking up an audio device.

The annotation result can be counted according to the scoring zone of the second wakeup confidence; if the audio data in the zone where the second wakeup confidence is located and the annotation result thereof indicates that the ratio of the audio data which is truly wakeup is greater than a pre-set threshold value, such as 99%, the zone where the second wakeup confidence is located can be considered as a target zone, for example, the target zone can be greater than 0.7, that is to say, it can be considered that the audio data corresponding to the second wakeup confidence which is greater than 0.7 are all data when the audio device is truly awake.

In the present embodiment, a target zone which is a wakeup threshold range is determined by counting an zone in which most audio data of each audio device on a line is a second wakeup confidence when actually waking up, so that the wakeup rate of a device to be monitored can be automatically and unsupervisedly monitored.

Optionally, the P pieces of audio data are obtained from audio log data of the N audio devices, the audio log data comprising a plurality of audio data, and the acquiring P pieces of audio data of N audio devices comprises:

classifying each piece of audio data in the audio log data by L dimensions respectively so as to obtain L pieces of classification characteristic information about each piece of audio data in the audio log data, L being a positive integer;

determining audio feature information for each dimension based on the classified feature information of the audio log data;

respectively sampling in the audio log data based on audio feature information about each dimension so as to obtain an audio sampling result of the L dimensions; and generating the P pieces of audio data comprising the audio sampling results of the L dimensions.

In this embodiment, since the audio data of the audio device is strongly correlated with the usage time of the user, the audio data can be classified from the time dimension.

In addition, due to the different usage habits of audio devices in the north and south, the audio data in different regions also have great differences, so the audio data can also be classified from the regional dimension.

In addition, since the version and the kind of the on-line audio device can be various, and the source of the audio data can be various, such as from an intelligent speaker device or from an intelligent recording device, the audio data can also be classified from the source dimension of the audio data.

In order to cover as many usage scenes as possible, taking L as 3 as an example, the L dimensions are a time dimension, a region dimension and a source dimension of audio data. For each audio data, each audio data in the audio log data may be separately classified in a time dimension, a geographical dimension, and a source dimension of the audio data.

If an audio data is strongly related to the user's usage time, which is the audio data of the user's morning, the classification characteristic information of the audio data in the time dimension is the audio data of the morning. And the audio data is northern region audio data, and the classification characteristic information about the audio data in the region dimension is northern region audio data. In addition, the audio data is from an intelligent speaker device, and the classification characteristic information of the audio data in the source dimension of the audio data is the audio data from the intelligent speaker device.

Audio feature information for each dimension may be determined based on classification feature information for audio data in the audio log data. For example, based on the classified feature information of the audio data in the audio log data in the time dimension, it can be statistically derived that the audio feature information in the time dimension is that the audio data in the morning and the night are relatively more, while the audio data in the morning and the afternoon are relatively less.

And based on the classified feature information about the audio data in the audio log data in the regional dimension, the audio data ratio of the east, west, south and north regions in the regional dimension can be statistically obtained. Based on the classified feature information about the audio data in the audio log data in the source dimension of the audio data, the audio data traffic under each source can be statistically derived.

Thereafter, sampling is performed in the audio log data based on the audio feature information of each dimension, respectively, so as to obtain audio sampling results of the L dimensions.

For example, if the audio feature information of the audio log data in the time dimension is that there is more audio data in the morning and the night, while there is less audio data in the morning and the afternoon, when sampling, high-frequency sampling can be performed in the audio data in the morning and the audio data in the night, while low-frequency sampling can be performed in the audio data in the morning and the audio data in the afternoon.

However, in the region dimension, the audio data of different regions can be selected according to the ratio of the audio data east, west, south and north regions, so as to ensure that the selected audio data hit more use scenes. For example, the ratio of audio data in the east, west, south and north regions is 1:2:3:4 respectively, and if 10,000 audio data needs to be selected, 1,000 audio data can be selected from the audio data in the east region, 2,000 audio data from the audio data in the west region, 3,000 audio data from the audio data in the south region, and 4,000 audio data from the audio data in the north region.

In the source dimension of audio data, the audio data under different sources can be selected according to the same ratio, and if the audio data traffic under a certain source is small, the sampling ratio can be increased, so as to prevent that the number of audio data of a certain device is small and the target zone of wake confidence when a real wake is unable to be effectively evaluated. For example, the audio data can be sampled from the audio data under each source in a ratio of 0.01%, and if the audio data traffic of the intelligent speaker device is small, the audio data can be sampled from the audio data of the intelligent speaker device in a ratio of 1%.

Aggregating the audio sampling results of the L dimensions to obtain an audio data set. In the aggregation, if there is repetition in the audio data of the L-dimensional audio sampling results, the repeated audio data can be eliminated, and finally P audio data of the N audio devices can be obtained.

In this embodiment, L classification feature information about each piece of audio log data is obtained by separately classifying each piece of audio log data in L dimensions, and audio feature information about each dimension is determined based on the classification feature information about the audio log data. In this way, the audio data in the audio log data can be refinedly selected according to the audio feature information of different dimensions, so that the obtained P audio data can hit more use scenes, and then the target zone where the second wakeup confidence of most audio data is located when each audio device actually wakes up can be effectively evaluated to improve the characterizes capability of the target zone.

Optionally, the L dimensions include at least one of:
A device type corresponding to the audio data;
A time period corresponding to the audio data;
The geographical area to which the audio data corresponds.

In the present embodiment, a device type corresponding to audio data is a source of the audio data, and corresponds to a source dimension of the audio data, and if the device type corresponding to the audio data is an intelligent speaker device, the source of the audio data is the intelligent speaker device.

In this embodiment, by classifying each piece of audio data in the audio log data from several dimensions of a device type, a time period and a region corresponding to the audio data, it is possible to finely select audio data of an audio device can be refined from the audio log data.

Optionally, the determining a first wakeup confidence for each of the M pieces of audio data comprises:
Performing feature extraction on target audio data to obtain audio features of the target audio data, wherein the target audio data is any one of the M pieces of audio data;
Scoring the target audio data based on the audio features to obtain a first wakeup confidence of the target audio data.

In this embodiment, the wakeup confidence model may comprise a wakeup off-line model and a confidence model, wherein the wakeup off-line model and the confidence model may be implemented in series, the wakeup off-line model may be used for performing feature extraction on the target audio data to obtain audio features of the target audio data, and the confidence model may score the target audio data based on the audio features of the target audio data to obtain a first wakeup confidence of the target audio data.

In the present embodiment, an audio feature of the target audio data is obtained by performing feature extraction on the target audio data; and scoring the target audio data on the basis of the audio feature to obtain a first wakeup confidence of the target audio data, so that the probability of the audio data containing a first wakeup word for waking up the device to be monitored can be evaluated.

Second Embodiment

Figure 2:
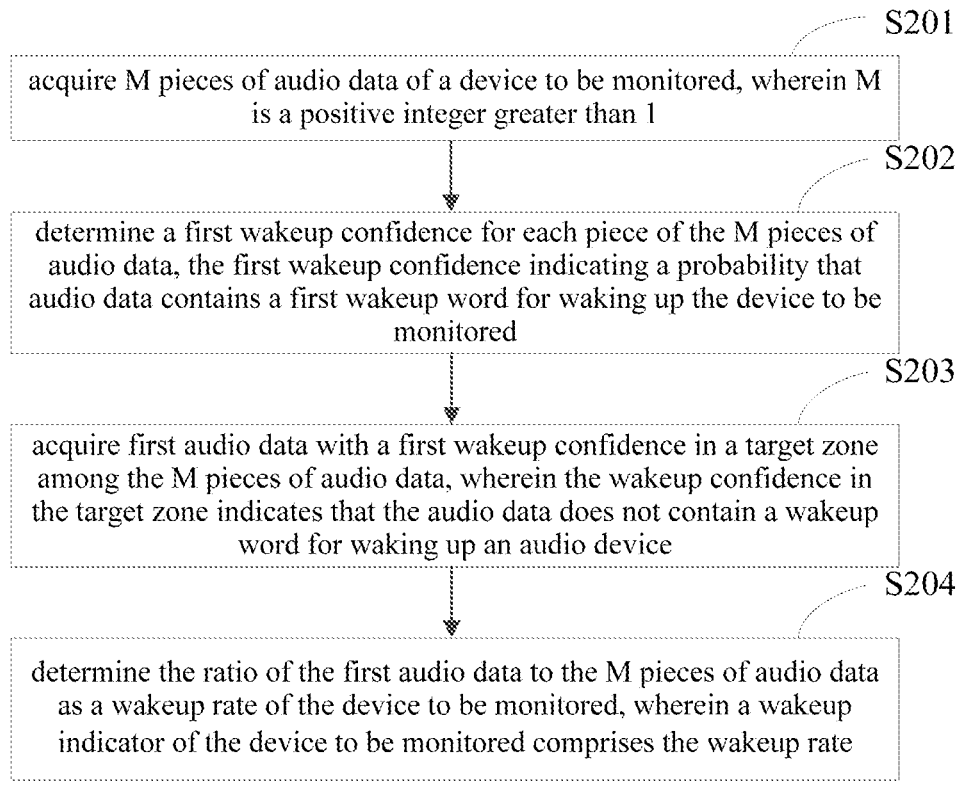
FIG. 2 is a flow diagram of a wakeup indicator monitoring method according to a second embodiment of the present application.

As shown in FIG. 2, the present application provides a wakeup indicator monitoring method, comprising the following steps:
Step S201: acquiring M pieces of audio data of a device to be monitored, wherein M is a positive integer greater than 1.
Step S202: determining a first wakeup confidence for each piece of the M pieces of audio data, the first wakeup confidence indicating a probability that audio data contains a first wakeup word for waking up the device to be monitored;
Step S203: acquiring first audio data with a first wakeup confidence in a target zone in the M pieces of audio data, wherein the wakeup confidence in the target zone characterizes that the audio data does not contain a wakeup word for waking up an audio device; and
Step S204: determining the ratio of the first audio data to the M pieces of audio data as a wakeup rate of the device to be monitored, where a wakeup indicator of the device to be monitored comprises the wakeup rate.

The purpose of this embodiment is to monitor a wakeup indicator of a device to be monitored, and the wakeup indicator can be a false wakeup rate, so as to monitor the wakeup performance of the device to be monitored, and perform device acceptance or product development.

This embodiment is similar to the implementation of the steps in the first embodiment, except that since the threshold range of the target zone is different, the significance of the indication is different, and therefore the monitored wakeup indicator is the false wakeup rate of the device to be detected.

In particular, the target zone may be a false wakeup threshold range, and in such an application scenario, the target zone characterizes that the audio data does not contain a wakeup word for waking up an audio device. The audio device may be an intelligent audio device. That is, if the wakeup confidence of the audio data is within the target zone, the audio data typically does not contain a wakeup word for the audio device.

In an application scenario where the target zone is a false wakeup threshold range, matching a first wakeup confidence of each piece of audio data in the M pieces of audio data with the target zone, and if the first wakeup confidence of the audio data in the M pieces of audio data is in the target zone, then the audio data is first audio data, and a first wakeup word is not contained therein, namely, the piece of audio data is audio data under the false wakeup of a device to be monitored. And if the first wakeup confidence of the audio data in the M pieces of audio data is not in the target zone, the audio data is not first audio data, and a first wakeup word may be contained therein, namely, the piece of audio data can be considered to be audio data under the normal wakeup of a device to be monitored.

In an application scenario where the target zone is a false wakeup threshold range, since the first audio data is audio data corresponding to a device to be monitored falsely waking up, the ratio of the first audio data to the M pieces of audio data can be determined as a false wakeup rate of the device to be monitored.

In practical applications, the false wakeup rate can be used as the evaluation criteria for product verification, for example, the higher the false wakeup rate of the device to be monitored, the worse the wakeup performance of the product is, and the product needs to be improved in terms of wakeup performance, while the lower the false wakeup rate of the device to be monitored, the better the wakeup performance of the product is.

In practical applications, the false wakeup rate can also verify the wakeup function of the product version, for example, when the product is developed, the device to be monitored embeds a new software version, in order to verify whether the software version has improved the wakeup performance, the false wakeup rate of the device to be monitored embedded with the new software version and the false wakeup rate of the device to be monitored embedded with the old software version can be compared, if the false wakeup rate has decreased, it means that the new software version has improved the wakeup performance, otherwise it needs to be improved.

In the present embodiment, by determining a first wakeup confidence of each piece of audio data in M pieces of audio devices of a device to be monitored; acquiring first audio data with a first wakeup confidence in a target zone in the M pieces of audio data, wherein the wakeup confidence in the target zone characterizes that the audio data does not contain a wakeup word for waking up an audio device; and determining a ratio of the first audio data to the M pieces of audio data as a false wakeup rate of the device to be monitored. In this way, the on-line audio data of the device to be monitored can be automatically and timely monitored with a high false wakeup rate, thereby improving the accuracy of the false wakeup rate monitoring. Also, it is possible to monitor a change in a false wakeup rate of each audio device on-line in large quantities and quickly.

Optionally, before the step S201, further comprising:
acquiring P pieces of audio data of N audio devices and an annotation result of the P pieces of audio data, wherein the annotation result indicates whether the audio data contains a second wakeup word for waking up the audio devices, N is a positive integer, and P is a positive integer greater than 1;
determining a second wakeup confidence of each piece of the P pieces of audio data; and
counting an zone where a second wakeup confidence of second audio data of which the ratio is greater than a pre-set threshold value in the P pieces of audio data is located, and obtaining the target zone, wherein the second audio data is the audio data with an annotation result that characterizes it contains the audio data of the second wakeup word.

In this embodiment, the target zone, which may be a false wake threshold range, may be determined by evaluating an zone of wake confidence when the audio data of each audio device on the line is false wake. That is, if most of the audio data of a plurality of audio devices does not contain a wakeup word for waking up the audio device within a certain zone of the wakeup confidence, it means that the audio data corresponding to the wakeup confidence within the zone is the data generated when the audio device wakes up erroneously.

Specifically, after determining the second wakeup confidence of each piece of audio data in the P pieces of audio data, the annotation result can be counted according to a scoring zone of the second wakeup confidence; if the audio data in the zone where the second wakeup confidence is located and the annotation result thereof indicates that the ratio of the audio data which is a false wakeup is greater than a pre-set threshold value, such as 95%, then the zone where the second wakeup confidence is located can be considered as a target zone, for example, the target zone can be less than 0.6, that is to say, it can be considered that the audio data corresponding to the second wakeup confidence of less than 0.6 are all data when the audio device wakes up erroneously.

It is also possible to determine a target zone as a false wake threshold range by counting an zone in which most audio data of each audio device on the line is a second wake confidence when the audio device is falsely awakened, so that the false wake rate of the device to be monitored can be automatically and unsupervisedly monitored.

Third Embodiment

Figure 3:
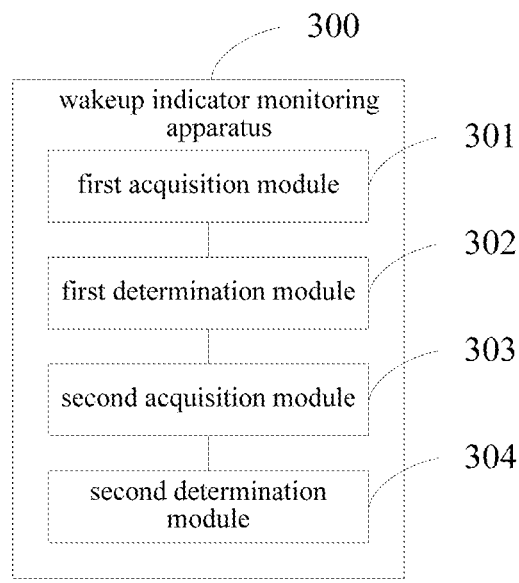
FIG. 3 is a schematic configuration diagram of a wakeup indicator monitoring apparatus according to a third embodiment of the present application.

As shown in FIG. 3, the present application provides a wakeup indicator monitoring device 300, comprising:
a first acquisition module 301 for acquiring M pieces of audio data of a device to be monitored, wherein M is a positive integer greater than 1;
a first determination module 302 for determining a first wakeup confidence of each piece of the M pieces of audio data, wherein the first wakeup confidence indicates a probability that audio data contains a first wakeup word for waking up the device to be monitored;
a second acquisition module 303 for acquiring first audio data of which the first wakeup confidence is in a target zone in the M pieces of audio data, wherein the wakeup confidence characterizes audio data in the target zone contains a wakeup word for waking up an audio device; and
a second determination module for determining the ratio of the first audio data to the M pieces of audio data as a wakeup rate of the device to be monitored, wherein a wakeup indicator of the device to be monitored comprises the wakeup rate.

Optionally, the apparatus further comprises:
a third acquisition module for acquiring P pieces of audio data of N audio devices and an annotation result of the P pieces of audio data, wherein the annotation result indicates whether the audio data contains a second wakeup word for waking up the audio devices, N is a positive integer, and P is a positive integer greater than 1;
a third determination module for determining a second wakeup confidence of each piece of the P pieces of audio data; and
a statistical module for counting an zone where a second wakeup confidence of second audio data of which the ratio is greater than a pre-set threshold value in the P pieces of audio data is located, so as to obtain the target zone, wherein the second audio data is the audio data with an annotation result which characterizes that it contains the second wakeup word.

Optionally, the P pieces of audio data are acquired from audio log data of the N audio devices, the audio log data comprises a plurality of audio data, and the third acquisition module comprises:
A classification unit for respectively classifying each piece of audio data in the audio log data by L dimensions so as to obtain L pieces of classification feature information about each piece of audio data in the audio log data, L being a positive integer;
a first determination unit for determining audio feature information about each dimension based on classification feature information about the audio log data;
a second determination unit for respectively sampling in the audio log data based on audio feature information about each dimension so as to obtain an audio sampling result of the L dimensions; and
a generation unit for generating the P pieces of audio data comprising the audio sampling results of the L dimensions.

Optionally, the first determination module 302 is specifically used for performing feature extraction on target audio data to obtain an audio feature of the target audio data, and the target audio data is any one of the M pieces of audio data; scoring the target audio data based on the audio features to obtain a first wakeup confidence of the target audio data.

The wakeup indicator monitoring apparatus 300 provided by the present application can implement the various processes implemented by the above-mentioned first embodiment of the wakeup indicator monitoring method, and can achieve the same advantageous effects, and in order to avoid repetition, the description thereof will not be repeated here.

Fourth Embodiment

Figure 4:
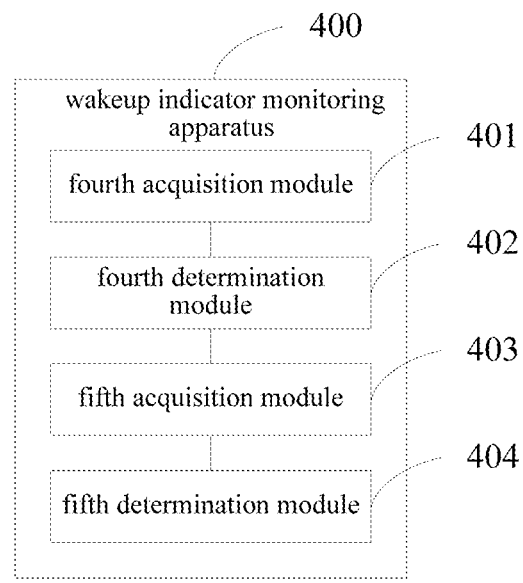
FIG. 4 is a schematic configuration diagram of a wakeup indicator monitoring apparatus according to a fourth embodiment of the present application.

As shown in FIG. 4, the present application provides a wakeup indicator monitoring device 400, comprising:
a fourth acquisition module 401 for acquiring M pieces of audio data of a device to be monitored, wherein M is a positive integer greater than 1;
a fourth determination module 402, used for determining a first wakeup confidence of each piece of the M pieces of audio data, wherein the first wakeup confidence indicates a probability that audio data contains a first wakeup word used for waking up the device to be monitored;
a fifth acquisition module 403, used for acquiring first audio data of which the first wakeup confidence is in a target zone in the M pieces of audio data, wherein the wakeup confidence characterizes audio data in the target zone does not contain a wakeup word used for waking up an audio device; and
a fifth determination module 404 for determining the ratio of the first audio data to the M pieces of audio data as a false wakeup rate of the device to be monitored, wherein a wakeup indicator of the device to be monitored comprises the false wakeup rate.

The wakeup indicator monitoring apparatus 400 provided by the present application can implement the various processes implemented by the above-mentioned second embodiment of the wakeup indicator monitoring method, and can achieve the same advantageous effects. In order to avoid repetition, the description thereof will not be repeated here.

The present application also provides an electronic device, a readable storage medium, and a computer program product according to embodiments of the present application.

Figure 5:
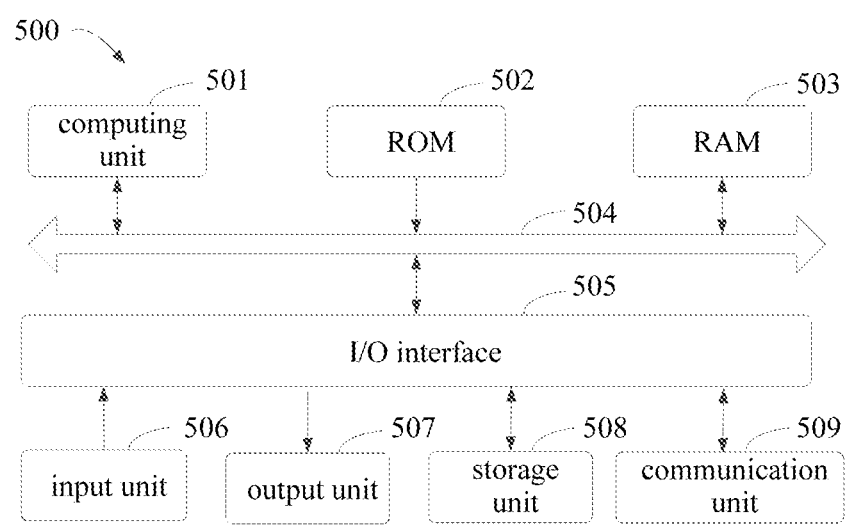
FIG. 5 illustrates a schematic block diagram of an example electronic device 500 that may be used to implement embodiments of the present disclosure.

FIG. 5 illustrates a schematic block diagram of an example electronic device 500 that may be used to implement embodiments of the present disclosure. Electronic devices are intended to represent various forms of digital computers, such as laptop computers, desktop computers, workstations, personal digital assistants, servers, blade servers, mainframe computers, and other suitable computers. Electronic devices may also represent various forms of mobile devices, such as personal digital assistants, cellular telephones, smart phones, wearable devices, and other similar computing devices. The components illustrated herein, their connections and relationships, and their functions are merely exemplary and are not intended to limit the implementations of the application described and/or claimed herein.

As shown in FIG. 5, the apparatus 500 includes a computing unit 501 that may perform various appropriate actions and processes in accordance with a computer program stored in a read-only memory (ROM) 502 or a computer program loaded from a storage unit 508 into a random access memory (RAM) 503. In the RAM 503, various programs and data required for the operation of the device 500 can also be stored. The calculation unit 501, the ROM 502 and the RAM 503 are connected to each other via a bus 504. An input/output (I/O) interface 505 is also coupled to bus 504.

A number of components in the device 500 are connected to the I/O interface 505, including: an input unit 506, such as a keyboard, a mouse, etc.; an output unit 507 such as various types of displays, speakers, and the like; A storage unit 508, such as a magnetic disk, an optical disk, etc.; and a communication unit 509, such as a network card, a modem, a wireless communication transceiver, etc. The communication unit 509 allows the device 500 to exchange information/data with other devices over a computer network such as the Internet and/or various telecommunication networks.

Computing unit 501 may be a variety of general purpose and/or special purpose processing components with processing and computing capabilities. Some examples of computing unit 501 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The calculation unit 501 performs various methods and processes described above, such as the wakeup indicator monitoring method. For example, in some embodiments, the wake indicator monitoring method may be implemented as a computer software program tangibly embodied on a machine-readable medium, such as storage unit 508. In some embodiments, part or all of the computer program may be loaded and/or installed on the device 500 via the ROM 502 and/or the communication unit 509. When the computer program is loaded into the RAM 503 and executed by the calculation unit 501, one or more of the steps of the wakeup indicator monitoring method described above may be performed. Alternatively, in other embodiments, the calculation unit 501 may be configured to perform the wakeup indicator monitoring method by any other suitable method, e. G. By means of firmware.

Various embodiments of the systems and techniques described herein above may be implemented in digital electronic circuitry, integrated circuit systems, field programmable gate arrays (FPGAs), application specific integrated circuits (ASICs), application specific standard products (ASSPs), systems on chip (SOCs), load programmable logic devices (CPLDs), computer hardware, firmware, software, and/or combinations thereof. These various embodiments may include: implemented in one or more computer programs, the one or more computer programs can be executed and/or interpreted on a programmable system comprising at least one programmable processor, which can be a dedicated or general purpose programmable processor, that can receive data and instructions from, and transmit data and instructions to, a storage system, at least one input device, and at least one output device.

Program code for implementing the methods of the present disclosure may be written in any combination of one or more editing languages. Such program code can be provided to a processor or controller of a general purpose computer, special purpose computer, or other programmable data processing apparatus, such that the program code when executed by the processor or controller causes the functions/acts specified in the flowchart and/or block diagram block or blocks to be performed. The program code may execute entirely on the machine, partly on the machine, as a stand-alone software package partly on the machine and partly on a remote machine or entirely on the remote machine or server.

In the context of this disclosure, a machine-readable medium can be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the preceding. More specific examples of a machine-readable storage medium would include an electrical connection based on one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the preceding.

To provide for interaction with a user, the systems and techniques described herein may be implemented on a computer having: A display device (e. G. a cathode ray tube (CRT) or liquid crystal display (LCD) monitor) for displaying information to a user; and a keyboard and a pointing device (e. G. a mouse or a trackball) through which a user can provide input to the computer. Other kinds of devices can also be used to provide interaction with the user; for example, the feedback provided to the user can be any form of sensory feedback (e. G. visual feedback, auditory feedback, or tactile feedback); the input from the user may be received in any form, including acoustic input, speech input, or tactile input.

The systems and techniques described herein can be implemented in a computing system that includes a background component (e. G. as a data server), or that includes a middleware component (e. G. an application server), or that includes a front-end component (e. G. a user computer having a graphical user interface or a web browser through which a user can interact with an implementation of the systems and techniques described herein), or any combination of such background, middleware, or front-end components. The components of the system may be interconnected by any form or medium of digital data communication (e. G. a communication network). Examples of communication networks include: local area networks (LANs), wide area networks (WANs), the Internet, and block chain networks.

The computer system may include a client and a server. Clients and servers are generally remote from each other and typically interact through a communication network. The relationship of client and server is generated by computer programs running on respective computers and having a client-server relationship to each other. The Server can be a cloud server, also referred to as a cloud computing server or a cloud host, which is a host product in the cloud computing service system, so as to solve the defects in the traditional physical host and virtual Private server ("Virtual Private Server", or "VPS" for short), such as great management difficulty and weak service scalability. The server may also be a server of a distributed system or a server incorporating a chain of blocks.

It should be understood that various forms of flow, reordering, adding or deleting steps shown above may be used. For example, the steps described in the present application may be performed in parallel, may be performed sequentially, or may be performed in a different order, and are not intended to be limiting herein as long as the desired results of the embodiments disclosed herein are achieved.

The above specific embodiments are not to be construed as limiting the scope of the present application. It will be apparent to those skilled in the art that various modifications, combinations, subcombinations, and substitutions can be made depending on design requirements and other factors. It is intended that all such modifications, equivalents, and alternatives falling within the spirit and scope of the invention be included therein.

What is claimed is:

1. A wakeup indicator monitoring method, applied to a voice interaction device to be monitored and used for audio testing of the voice interaction device, the method is performed by a wakeup indicator monitoring device and comprises:

acquiring, by the wakeup indicator monitoring device, M pieces of audio data of the voice interaction device to be monitored, wherein M is a positive integer greater than 1;

determining, by the wakeup indicator monitoring device, a first wakeup confidence for each piece of the M pieces of audio data, the first wakeup confidence indicating a probability that audio data contains a first wakeup word for waking up the device to be monitored;

acquiring, by the wakeup indicator monitoring device, a first audio data with a first wakeup confidence in a target zone in the M pieces of audio data, wherein the wakeup confidence indicates that the audio data in the target zone comprises a wakeup word for waking up an audio device; and determining, by the wakeup indicator monitoring device, the ratio of the first audio data to the M pieces of audio data as a wakeup rate of the device to be monitored, where a wakeup indicator of the device to be monitored comprises the wakeup rate;

wherein prior to obtaining M pieces of audio data for a device to be monitored, the method further comprises:

acquiring, by the wakeup indicator monitoring device, P pieces of audio data of N audio devices and an annotation result of the P pieces of audio data, wherein the annotation result indicates whether the audio data contains a second wakeup word for waking up the audio devices, N is a positive integer, and P is a positive integer greater than 1;

determining, by the wakeup indicator monitoring device, a second wakeup confidence of each piece of the P pieces of audio data; and counting, by the wakeup indicator monitoring device, an zone where a second wakeup confidence of second audio data of which the ratio is greater than a pre-set threshold value in the P pieces of audio data is located, and obtaining the target zone, wherein the second audio data is the audio data with an annotation result that characterizes it contains the audio data of the second wakeup word;

wherein the P pieces of audio data are obtained from audio log data of the N audio devices, the audio log data comprising a plurality of audio data, and the acquiring P pieces of audio data of N audio devices comprises:

classifying, by the wakeup indicator monitoring device, each piece of audio data in the audio log data by L dimensions respectively so as to obtain L pieces of classification characteristic information about each piece of audio data in the audio log data, L being a positive integer;

determining, by the wakeup indicator monitoring device, audio feature information for each dimension based on the classified feature information of the audio log data;

respectively sampling, by the wakeup indicator monitoring device, in the audio log data based on audio feature information about each dimension so as to obtain an audio sampling result of the L dimensions; and generating, by the wakeup indicator monitoring device, the P pieces of audio data comprising the audio sampling results of the L dimensions.

2. The method of claim 1, wherein the determining a first wakeup confidence for each piece of the M pieces of audio data comprises:

performing feature extraction on target audio data to obtain audio features of the target audio data, wherein the target audio data is any one of the M pieces of audio data; and scoring the target audio data based on the audio features to obtain a first wakeup confidence of the target audio data.

3. A non-transitory computer-readable storage medium storing computer instructions for causing a computer to perform the method of claim 1.

4. A wakeup indicator monitoring method, applied to a voice interaction device to be monitored and used for audio testing of the voice interaction device, the method is performed by a wakeup indicator monitoring device and comprises:

acquiring, by the wakeup indicator monitoring device, M pieces of audio data of the voice interaction device to be monitored, wherein M is a positive integer greater than 1;

determining, by the wakeup indicator monitoring device, a first wakeup confidence for each piece of the M pieces of audio data, the first wakeup confidence indicating a probability that audio data contains a first wakeup word for waking up the device to be monitored;

acquiring, by the wakeup indicator monitoring device, first audio data with a first wakeup confidence in a target zone in the M pieces of audio data, wherein the wakeup confidence in the target zone characterizes that the audio data does not contain a wakeup word for waking up an audio device; and determining, by the wakeup indicator monitoring device, the ratio of the first audio data to the M pieces of audio data as a false wakeup rate of the device to be monitored, where a wakeup indicator of the device to be monitored comprises the false wakeup rate;

wherein prior to obtaining M pieces of audio data for a device to be monitored, the method further comprises:

acquiring, by the wakeup indicator monitoring device, P pieces of audio data of N audio devices and an annotation result of the P pieces of audio data, wherein the annotation result indicates whether the audio data contains a second wakeup word for waking up the audio devices, N is a positive integer, and P is a positive integer greater than 1;

determining, by the wakeup indicator monitoring device, a second wakeup confidence of each piece of the P pieces of audio data; and counting, by the wakeup indicator monitoring device, an zone where a second wakeup confidence of second audio data of which the ratio is greater than a pre-set threshold value in the P pieces of audio data is located, and obtaining the target zone, wherein the second audio data is the audio data with an annotation result that characterizes it contains the audio data of the second wakeup word;

wherein the P pieces of audio data are obtained from audio log data of the N audio devices, the audio log data comprising a plurality of audio data, and the acquiring P pieces of audio data of N audio devices comprises:

classifying, by the wakeup indicator monitoring device, each piece of audio data in the audio log data by L dimensions respectively so as to obtain L pieces of classification characteristic information about each piece of audio data in the audio log data, L being a positive integer;

determining, by the wakeup indicator monitoring device, audio feature information for each dimension based on the classified feature information of the audio log data;

respectively sampling, by the wakeup indicator monitoring device, in the audio log data based on audio feature information about each dimension so as to obtain an audio sampling result of the L dimensions; and generating, by the wakeup indicator monitoring device, the P pieces of audio data comprising the audio sampling results of the L dimensions.

5. An electronic device comprising:

at least one processor; and a memory communicatively coupled to the at least one processor; wherein, the memory stores instructions are executable by the at least one processor to enable the at least one processor to perform the method of claim 4.

6. A non-transitory computer-readable storage medium storing computer instructions for causing a computer to perform the method of claim 4.

7. An electronic device comprising:
at least one processor; and
a memory communicatively coupled to the at least one processor; wherein,
the memory stores instructions are executable by the at least one processor to enable the at least one processor to perform a wakeup indicator monitoring method, the method is applied to a voice interaction device to be monitored and used for audio testing of the voice interaction device, the method is performed by a wakeup indicator monitoring device and comprises:
acquiring M pieces of audio data of a voice interaction device to be monitored, wherein M is a positive integer greater than 1;
determining a first wakeup confidence for each piece of the M pieces of audio data, the first wakeup confidence indicating a probability that audio data contains a first wakeup word for waking up the device to be monitored;
acquiring a first audio data with a first wakeup confidence in a target zone in the M pieces of audio data, wherein the wakeup confidence indicates that the audio data in the target zone comprises a wakeup word for waking up an audio device; and
determining the ratio of the first audio data to the M pieces of audio data as a wakeup rate of the device to be monitored, where a wakeup indicator of the device to be monitored comprises the wakeup rate;
wherein prior to obtaining M pieces of audio data for a device to be monitored, the method further comprises:
acquiring P pieces of audio data of N audio devices and an annotation result of the P pieces of audio data, wherein the annotation result indicates whether the audio data contains a second wakeup word for waking up the audio devices, N is a positive integer, and P is a positive integer greater than 1;
determining a second wakeup confidence of each piece of the P pieces of audio data; and
counting an zone where a second wakeup confidence of second audio data of which the ratio is greater than a pre-set threshold value in the P pieces of audio data is located, and obtaining the target zone, wherein the second audio data is the audio data with an annotation result that characterizes it contains the audio data of the second wakeup word;
wherein the P pieces of audio data are obtained from audio log data of the N audio devices, the audio log data comprising a plurality of audio data, and the acquiring P pieces of audio data of N audio devices comprises:
classifying each piece of audio data in the audio log data by L dimensions respectively so as to obtain L pieces of classification characteristic information about each piece of audio data in the audio log data, L being a positive integer;
determining audio feature information for each dimension based on the classified feature information of the audio log data;
respectively sampling in the audio log data based on audio feature information about each dimension so as to obtain an audio sampling result of the L dimensions; and
generating the P pieces of audio data comprising the audio sampling results of the L dimensions.

8. The electronic device of claim 7, wherein the at least one processor is configured to perform:
prior to obtaining M pieces of audio data for a device to be monitored, acquiring P pieces of audio data of N audio devices and an annotation result of the P pieces of audio data, wherein the annotation result indicates whether the audio data contains a second wakeup word for waking up the audio devices, N is a positive integer, and P is a positive integer greater than 1;
determining a second wakeup confidence of each piece of the P pieces of audio data; and
counting an zone where a second wakeup confidence of second audio data of which the ratio is greater than a pre-set threshold value in the P pieces of audio data is located, and obtaining the target zone, wherein the second audio data is the audio data with an annotation result that characterizes it contains the audio data of the second wakeup word.

9. The electronic device of claim 8, wherein the P pieces of audio data are obtained from audio log data of the N audio devices, the audio log data comprising a plurality of audio data, and the acquiring P pieces of audio data of N audio devices comprises:
classifying each piece of audio data in the audio log data by L dimensions respectively so as to obtain L pieces of classification characteristic information about each piece of audio data in the audio log data, L being a positive integer;
determining audio feature information for each dimension based on the classified feature information of the audio log data;
respectively sampling in the audio log data based on audio feature information about each dimension so as to obtain an audio sampling result of the L dimensions; and
generating the P pieces of audio data comprising the audio sampling results of the L dimensions.

10. The electronic device of claim 7, wherein the determining a first wakeup confidence for each piece of the M pieces of audio data comprises:
performing feature extraction on target audio data to obtain audio features of the target audio data, wherein the target audio data is any one of the M pieces of audio data; and
scoring the target audio data based on the audio features to obtain a first wakeup confidence of the target audio data.

* * * * *